United States Patent [19]
Kamada et al.

[11] Patent Number: 5,785,469
[45] Date of Patent: Jul. 28, 1998

[54] WORKING APPARATUS

[75] Inventors: Teruo Kamada; Takashi Ichizawa, both of Saitama-ken, Japan

[73] Assignee: Honda Giken Kogyo Kabushiki Kaisha, Tokyo, Japan

[21] Appl. No.: 396,471

[22] Filed: Mar. 2, 1995

[30] Foreign Application Priority Data

Nov. 22, 1994 [JP] Japan .................. 6-288362

[51] Int. Cl.[6] .................................... B23C 1/06
[52] U.S. Cl. .................. 409/191; 409/202; 409/219; 408/69
[58] Field of Search ................. 409/191, 197, 409/202, 205, 206, 212, 219, 225, 159, 167, 163, 157, 145, 190; 408/42, 69, 70

[56] References Cited

U.S. PATENT DOCUMENTS

| | | | |
|---|---|---|---|
| 2,007,180 | 7/1935 | Doran et al. | 409/212 X |
| 2,819,743 | 1/1958 | Birkel et al. | 408/69 X |
| 3,371,580 | 3/1968 | Barnes et al. | 409/191 |
| 3,906,834 | 9/1975 | Gladwin | 409/197 X |
| 4,338,710 | 7/1982 | Stursa et al. | 408/50 X |
| 4,605,115 | 8/1986 | Genans | 408/70 X |
| 4,679,295 | 7/1987 | Lopez | 408/70 X |
| 5,004,381 | 4/1991 | Jenkner | 408/42 X |
| 5,088,181 | 2/1992 | Jeppsson | 409/219 X |
| 5,154,643 | 10/1992 | Catania et al. | 409/212 X |
| 5,243,745 | 9/1993 | Varnau | 409/219 X |
| 5,340,247 | 8/1994 | Cuneo et al. | 409/202 |
| 5,375,951 | 12/1994 | Veale | 409/219 X |

FOREIGN PATENT DOCUMENTS

| | | | |
|---|---|---|---|
| 3522069 | 1/1987 | Germany | 408/69 |
| 004117723 | 12/1991 | Germany | 408/87 |
| 5305511 | 11/1993 | Japan . | |

*Primary Examiner*—Daniel W. Howell
*Assistant Examiner*—Henry W. H. Tsai
*Attorney, Agent, or Firm*—Weiner, Carrier, Burt & Esser, P.C.; Joseph P. Carrier; William F. Esser

[57] ABSTRACT

An apparatus for cutting a piece of work has a work supporting table which is movable only in one horizontal direction, and a spindle unit including a cutting tool which is disposed below the table for cutting the work from below. The spindle unit is movable in another horizontal direction perpendicular to the direction in which the table is movable, and in a vertical direction. The apparatus requires only a small space for installation, is simple in construction, an can perform an accurate cutting job at a high speed.

28 Claims, 5 Drawing Sheets

WORKING APPARATUS

BACKGROUND OF THE INVENTION

1. Field of the Invention

This invention relates to a working apparatus which can, for example, shape a foam block into a vanishing pattern which is used when a mold or die, such as a press die, is made by casting.

2. Description of the Related Art

There is known a process for making a mold or die, such as a press die, by employing a vanishing pattern formed from a combustible foam block and having the same shape as the die to be made. Sand, such as resin sand, is packed around the pattern, and molten metal is poured against the pattern causing it to vanish through combustion and replacing it with a the molten metal which solidifies to form a die having the initial shape of the pattern. This process is known as full mold casting to a desired shape.

The pattern is made by cutting the foam block. Japanese Patent Application KOKAI No. Hei 5-305511 discloses a known cutting apparatus. The apparatus includes a working unit which is movable in the vertical (or Z) direction, while moving a foam block in a horizontal plane (or in the x and Y directions), for cutting it into a desired shape.

The apparatus, however, has a number of drawbacks. Its installation requires a space which is sufficiently large to ensure the satisfactory movement of the foam block in the horizontal plane (or the X and Y directions). The space required is so large that installation of the apparatus is difficult in a factory in which only a limited space is available.

Further, the horizontal movement of the foam block is likely to cause deflection of the mechanical part of the apparatus, particularly when the block is moved to have its end portion worked on. Moreover, the apparatus includes a movable table on which the foam block is supported, and a device carried on the table for driving it in the X and Y directions. Therefore, the speed of movement of the movable table and its rigidity are likely to affect the accuracy with which the foam block is worked on.

It is an object of this invention to overcome the drawbacks of the known apparatus as pointed out above.

SUMMARY OF THE INVENTION

According to this invention, there is provided a working apparatus which comprises a horizontally movable work supporting table, means for moving the table in one direction in a horizontal plane, means disposed below the table movable in another direction for working on the work on the table, means for moving the working means in the other direction, a tool held by the working means and movable in a different direction for working directly on the work, and means for moving the tool in the different direction.

The work supporting table is movable only in one direction in the horizontal plane, for example, in the longitudinal or X direction. The work supporting table is mounted on a column on which the working means holding the tool is supported. The working means is movable in the horizontal direction which is perpendicular to the direction in which the table is movable. The tool which is held by the working means is movable in a vertical direction. The tool comprises, for example, a spindle which can be driven by a driving device moving together, and a device attached to the end thereof for cutting the work, such as a foam block, from below.

The operation of the apparatus is carried out by the combination of the movement of the work supporting table in, for example, the X (or longitudinal) direction, the movement of the working means in the Y (or transverse) direction and the movement of the tool such as a spindle, in the Z (or vertical) direction. It does not require any movement of the work in two directions, such as both of the X and Y directions.

The work supporting table is movable only in one direction, for example, the longitudinal direction, and as it requires a smaller range of movement of the work, the apparatus of this invention can be installed in a space which is significantly smaller than that required for the installation of the known apparatus requiring for the horizontal movement of the work in both of the X and Y directions. It is also simpler in construction than the known apparatus. Moreover, the movement of the work supporting table only in one direction enables a reduction of the load bearing upon the device for moving it, and thereby also enables an improvement in the speed and accuracy with which the apparatus is operable.

A Z-direction balancer may be provided for the spindle which is movable in the vertical, or Z-direction, and the driving device therefor. The balancer enables a reduction of the load imposed on the driving device, such as a motor, in the Z-direction by the weight of the driving device, such as a spindle motor, the spindle and the cutting device, and thereby a reduction in size and weight of the motor, as well as a reduction of the load bearing upon the Z-direction guides, etc. Other objects, advantages and salient features of the invention will become apparent from the following detailed description which, when considered together with the annexed drawings, describes a preferred embodiment of the invention.

DETAILED DESCRIPTION OF A PREFERRED EMBODIMENT OF THE INVENTION

Description will now be made in detail of a preferred embodiment of this invention with reference to the accompanying drawings.

This invention can be outlined as an apparatus in which a work supporting table on which work is mounted, secured and positioned is moved in a horizontal plane, so that the work may be worked on by a tool disposed below the table. The work mounted, positioned and secured on the work supporting table is a material, such as a foam block, for a vanishing pattern which may be used to make a mold or die by casting. The table is movable only in one direction in the horizontal plane, and is equipped with means for moving it. The apparatus also includes means for working on the work on the table, and the working means is movable in another direction, and is equipped with means for moving it. The working means is equipped with a tool, as for cutting, and the tool is equipped with means for moving it in still another direction.

The work supporting table is movable only in one direction in the horizontal plane, and the working means disposed below the table and equipped with the tool is movable in another direction in the horizontal plane, preferably perpendicular to the one direction. The tool, such as a working spindle, attached to the working means and movable therewith is movable in still another direction, or more specifically, in the vertical or Z direction. These movements cause the three-dimensional movements of the work and spindle relative to each other and thereby enable the cutting of the work, such as a foam block into desired patterns.

Description will now be made in more specific detail of an apparatus embodying this invention. The apparatus 1 is intended for cutting a foam block W or work to prepare a vanishing pattern which is used in making a mold or die, such as a press die, by casting. The apparatus 1 includes mechanisms which are movable along three axes perpendicular to one another (or in the X, Y and Z-directions) as shown in FIGS. 1 and 2 and for cutting the work.

More specifically, the apparatus 1 includes a work supporting table 3 mounted on a column 2, and means 4 for moving the table 3 on which the foam block W is mounted. It also includes working means 5 for cutting the foam block W from below, and work holding means 6 for positioning and holding the foam block W on the table 3. The horizontal direction along the short sides of the column 2 (or the longitudinal direction of the apparatus) is shown as the X direction, the horizontal direction along its long sides (or the transverse direction) as the Y direction, and the vertical direction of the column 2 as the Z direction.

Figure 1:
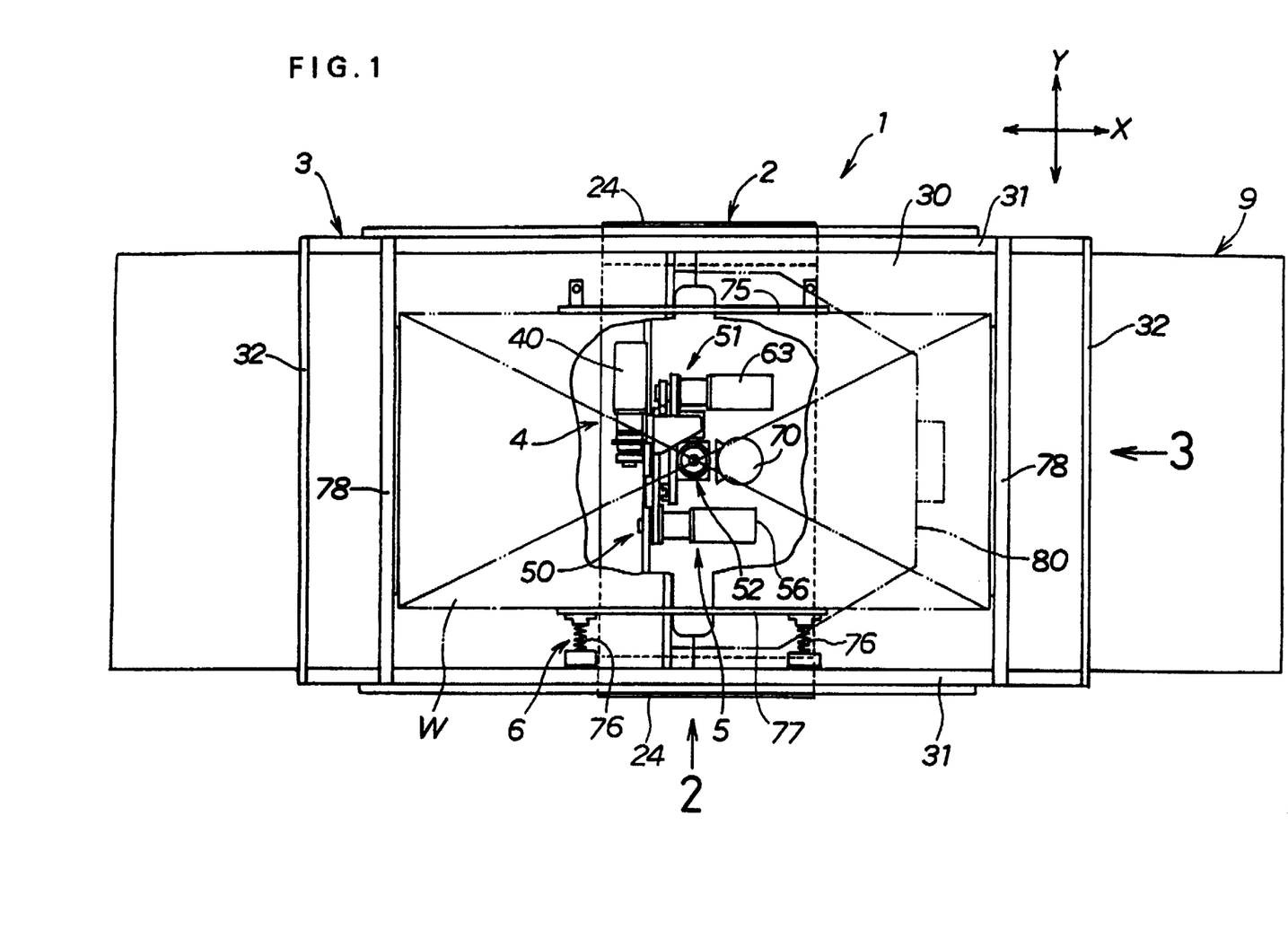
FIG. 1 is a top plan view of a working apparatus embodying this invention.
Figure 2:
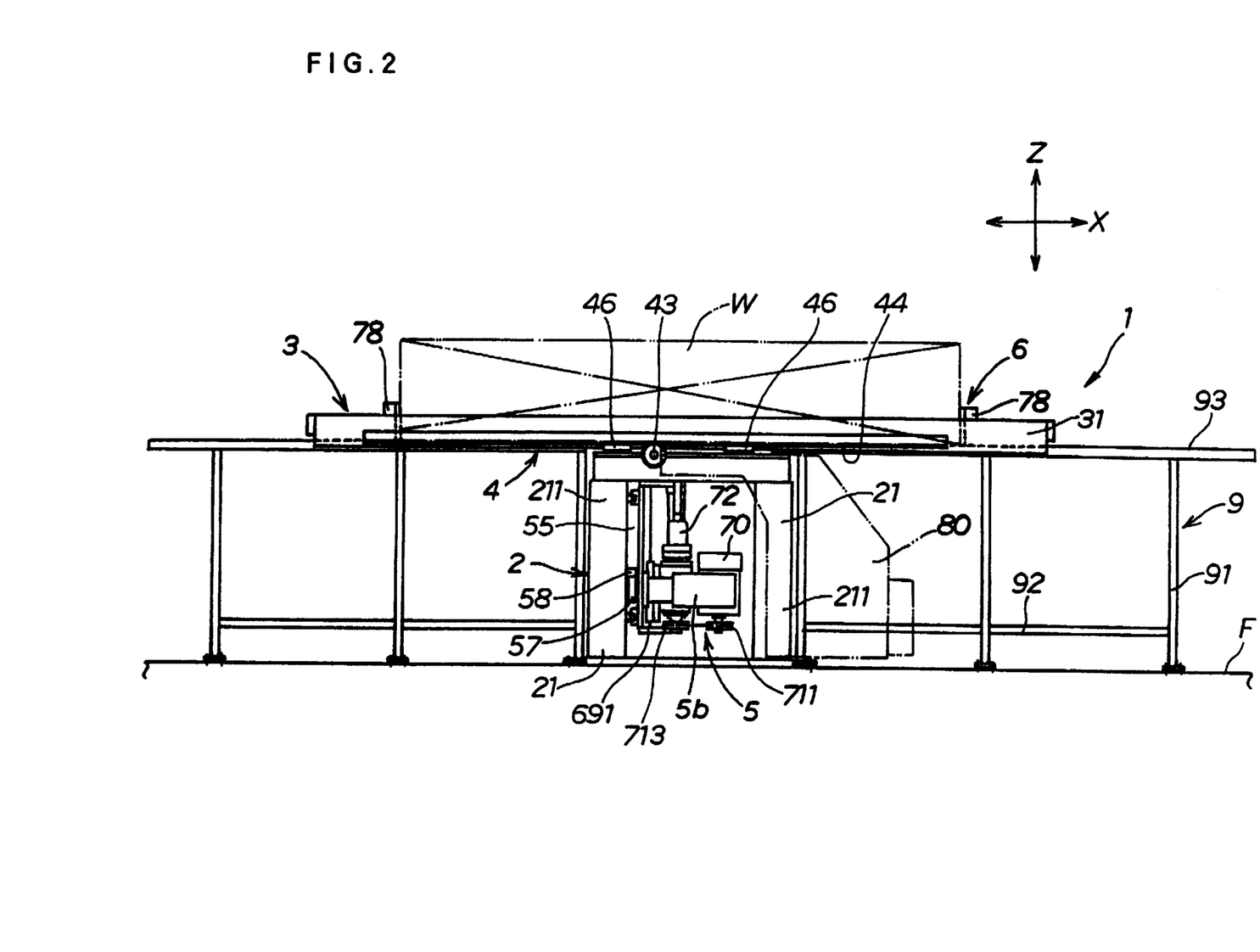
FIG. 2 is a side elevational view of the apparatus as taken in the direction of an arrow 2 in FIG. 1.

The column 2 is mounted in a base frame 9 erected on a floor F, and comprising vertical frame members 91 upstanding from the floor F reinforcing frame members 92 connecting the vertical frame members 91 near their lower ends and a horizontal frame member 93 on the upper ends of the vertical frame members 91, as shown in FIGS. 1 and 2. The column 2 is a three-dimensional frame structure mounted in the longitudinally middle portion of the base frame 9 and extending substantially along the transverse width thereof The column 2 comprises vertical members 21 formed from e.g. square pipes and erected on a bottom plate 20 at four corners thereof, three horizontal members 22, 23 and 22 formed from e.g. square pipes and extending transversely in the Y direction between the rear vertical members 211, and a pair of top members 24 each extending in the X (or longitudinal) direction between a pair of front and rear vertical members 212.

Figure 3:
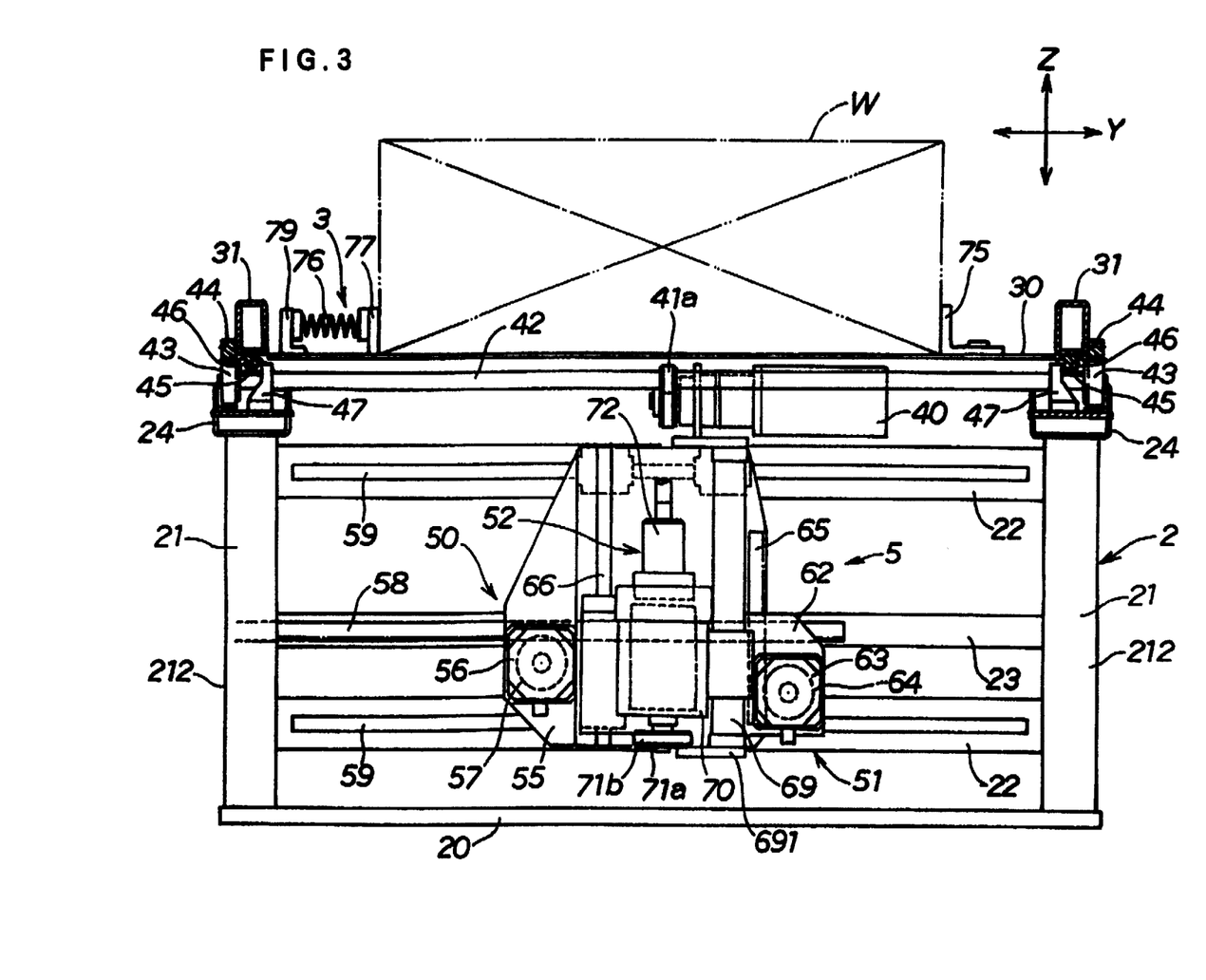
FIG. 3 is an enlarged and partly cutaway front elevational view of the apparatus as taken in the direction of an arrow 3 in FIG. 1.
Figure 4:
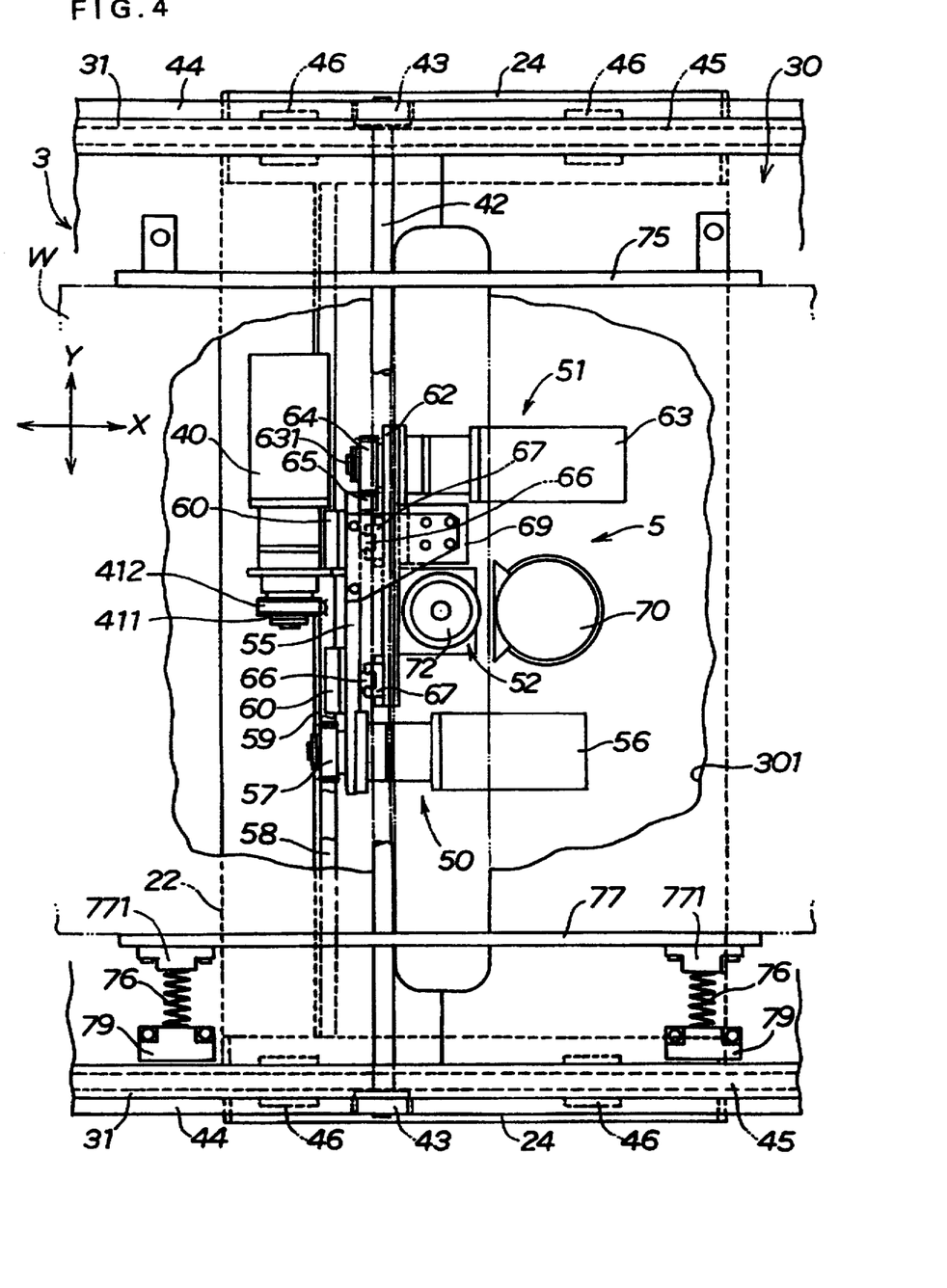
FIG. 4 is an enlarged and partly cutaway top plan view of a part of the apparatus shown in FIG. 1.
Figure 5:
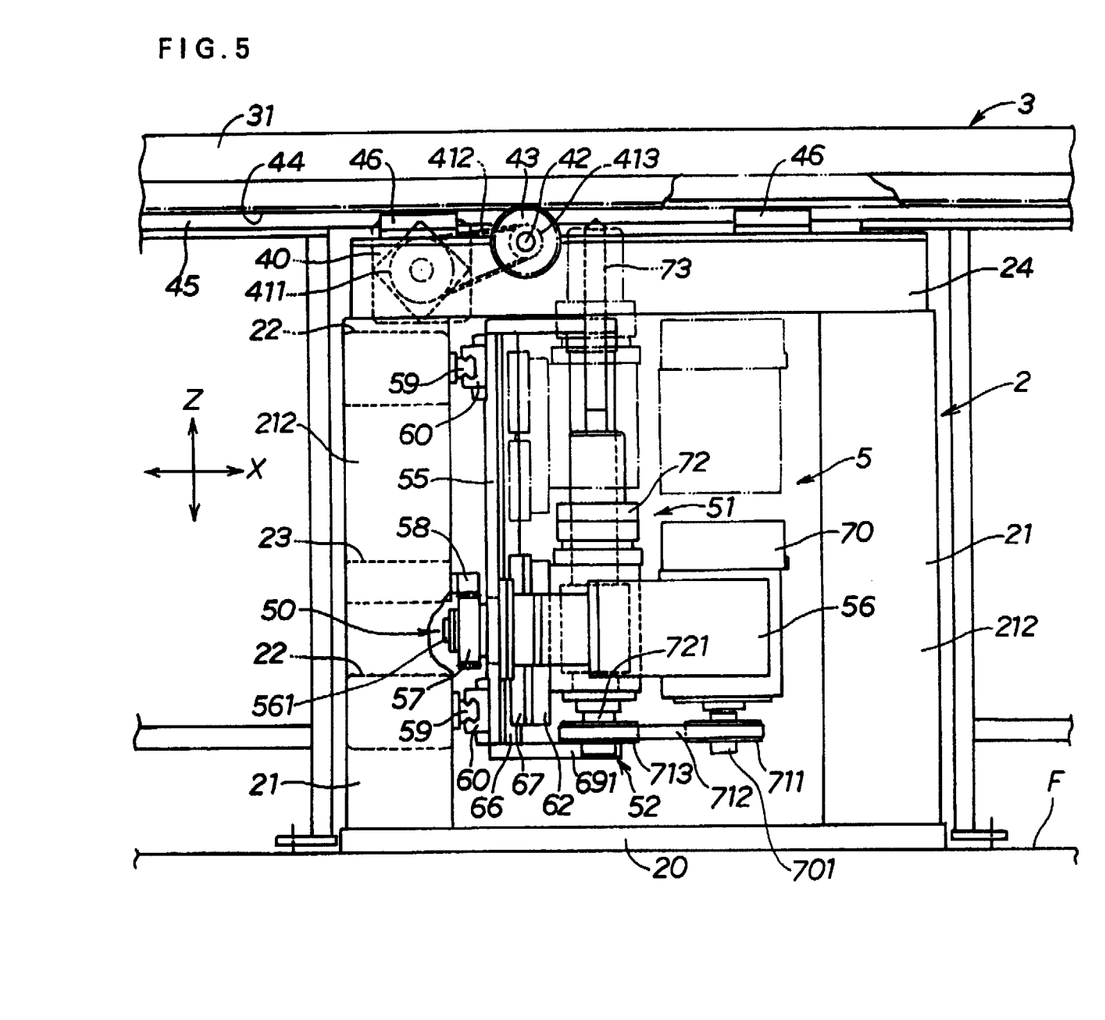
FIG. 5 is an enlarged and partly cutaway view of a part of FIG. 2.

The work supporting table 3 comprises a table 30 having an opening 301 in its center, as shown in FIGS. 3 and 4. The work supporting table 30 is provided at its transverse ends with a pair of parallel and transversely spaced apart frame members 31 formed from e.g. square pipes and extending in the X direction as shown in FIG. 4. It is also provided with a pair of longitudinally spaced apart frame members 32 connecting the ends of the transversely spaced apart frame members 31, as shown in FIG. 1, so that they form a rectangular fame as viewed in top plan. The work moving means 4 is positioned below the work supporting table 3, as shown in FIGS. 3 to 5, for moving the foam block w along the short sides of the column 2 (or in the X, or longitudinal direction of the apparatus). The work moving means 4 includes a driving device, means for transmitting a driving force, and guide means.

The work moving means 4 includes as the driving device an X-axis motor 40 which is secured to the upper of the horizontal members 22. The driving force transmitting means comprises a drive pulley 411 attached to the output shaft of the motor 40, a driven pulley 413 attached to the input shaft 42 of a pinion 43 situated behind the motor 40, and a timing belt 412 connected between the pulleys 411 and 413. The driving force of the motor 40 is transmitted through the pulley 411, timing belt 412, and pulley 413 to drive the pinion 43. The transversely spaced apart frame members 31 are each provided along its bottom with a rack 44 with which the pinion 43 meshes to move the supporting table 3in the X direction.

The guide means comprises a pair of X-axis guide rails 45 secured longitudinally to the bottoms of the transversely spaced apart frame members 31, respectively, and a pair of X-axis linear guides 46 engaged slidably by the guide rails 45, respectively, as shown in FIG. 3. The linear guides 46 are secured to the top members 24, respectively. The input shaft 42 for the pinions 43 is rotatably supported by bearings 47 secured to the top members 24.

The working means 5 is positioned below the work supporting table 3, as shown in FIGS. 3 to 5. The working means 5 comprises a first drive unit 50, a second drive unit 51 and a spindle unit 52 as a tool for cutting a foam block as the work W. The first drive unit 50 is movable along the long sides of the column 2 as shown in FIG. 3 (or in the Y direction). The second drive unit 51 is supported by the first drive unit 50, as shown in FIGS. 3 and 5, movably at right angles to the long sides of the column 2 (or to the Y direction) (or in the z direction). The spindle unit 52 is supported by the second drive unit 51.

The first drive unit 50 includes a driving device, means for transmitting a driving force, and guide means, as shown in FIGS. 4 and 5.

The first drive unit 50 includes as the driving device a Y-axis motor 56 secured to a Y-axis plate 55. The driving force transmitting means includes a Y-axis drive pinion 57 secured to the shaft 561 of the motor 56. It also includes a rack 58 provided along the inner side of the transversely extending horizontal member 23 in the vertically middle portion of one of the vertical members 212. The pinion 57 and the rack 58 meshing with each other form the means for transmitting the driving force for movement along the Y axis. The guide means includes a pair of parallel vertically spaced apart Y-axis guide rails 59 extending transversely (or in the Y direction) along the inner sides of the horizontal members 22 between which the horizontal member 23 lies. It also includes a pair of parallel vertically spaced apart Y-axis linear guides 60 provided on the rear side of the Y-axis plate 55. The guide rails 59 and the linear guides 60 in slidable engagement therewith form the guide means.

The second drive unit 51 includes a driving device, means for transmitting a driving force, and guide means, as shown in FIGS. 4 and 5.

The second drive unit 51 includes a motor 63 for effecting movement along the Z axis as the driving device. The motor 63 is securely supported on a Z-axis plate 62. The Z-axis plate 62 is provided on its front side with a pair of transversely spaced apart and vertically extending Z-axis linear guides.67. The Y-axis plate 55 is provided with a pair of vertically extending Z-axis guide rails 66 spaced apart from each other transversely (or in the Y direction as shown in FIG. 4). The guide rails 66 and the linear guides 67 engaging them form the guide means for movement along the Z axis.

The motor 63 has a shaft 631 to which a pinion 64 is secured. The Y-axis plate 55 is provided with a vertically extending Z-axis rack 65, as shown in FIG. 3. The pinion 64 meshes with the rack 65, so that the motor 63 may drive the pinion 64 to move the Z-axis plate 62 including the motor 63 vertically, or in the Z direction along the rack 65.

The spindle unit 52 is supported by the second drive unit 51. The spindle unit 52 includes a spindle motor 70 as a driving device, as shown in FIGS. 3 to 5, and the motor 70 is connected to a vertically mounted spindle 72 to transmit a driving force to it. The driving force of the motor 70 is transmitted to the spindle 72 by a power transmitting mechanism which comprises a pulley 711 attached to the downwardly extending output shaft 701 of the motor 70, a pulley 713 attached to the downwardly extending shaft 721 of the spindle 72 and a timing belt 712 extending between the pulleys 711 and 713. The spindle 72 carries a cutting tool 73 at its upper end.

The spindle motor 70 and the spindle 72 are secured to a Z-axis balancer 69 which comprises a rodless air cylinder. The Z-axis balancer 69 is provided for achieving a balance of load on the second drive unit 51 to reduce the load imposed upon the Z-axis drive motor 63 by the weight of the spindle motor 70, the spindle 72 and the cutting tool 73, so that the motor 63 may be a small one which is light in weight. It is also intended for reducing the load bearing upon the Z-axis linear guides 67, and is secured to the Y-axis plate 55 by a supporting plate 691.

The means for holding the work W, such as a foam block, is shown in FIGS. 3 and 4. The work supporting table 30 is provided near one end thereof with a fixed clamp member 75 which can hold the foam block W against displacement in the Y direction. Near the table's opposite end, it is provided with a movable clamp member 77 which is elastically movable in the Y direction. More specifically, the movable clamp member 77 is provided on its rear side with a pair of longiudinally spaced apart brackets 771, while the work supporting table 30 is provided adjacent to its opposite end with a pair of longitudinally spaced apart fixed brackets 79 each facing one of the brackets 771. A pair of springs 76 are provided between one of the brackets 79 and the bracket 771 facing it and between the other bracket 79 and the bracket 771 facing it, respectively, for urging the movable clamp member 77 in the Y direction to hold the foam block W against the fixed clamp member 75.

A pair of longitudinally spaced apart clamp members 78 are connected to and between the transversely spaced apart frame members 31 near the opposite ends thereof, as shown in FIG. 1. The clamp members 78 hold the foam block W against displacement in the X direction.

A chip receptacle is shown at 80 in FIG. 1 for storing the chips-resulting from the cutting of the foam block W.

Description will now be made of the operation of the working apparatus 1 of which the construction has been described.

The foam block W is mounted on the work supporting table 3, so that one side of the foam block W may abut on the fixed clamp member 75. The movable clamp member 77 is allowed to engage the opposite side of the foam block W, so that the elastic force of the springs 76 may urge the movable clamp member 77 to hold the foam block W against the fixed clamp member 75. As a result, the foam block W is held against displacement in the Y direction. The clamp members 78 are positioned to engage the longitudinally spaced apart ends of the foam block W to hold it against displacement in the X direction.

The cutting tool 73 attached to the end of the spindle 72 is located in its desired three-dimensional position relative to the foam block W (as viewed in the X, Y and Z directions). The X-axis motor 40 for moving the foam block W in the X direction is driven by a control device not shown to rotate the pinions at the end 5 of the input shaft 42. The pinions 43 meshing with the racks 44 cause the movement of the work supporting table 30 and thereby the foam block W in the X direction. If the Y-axis drive motor 56 is driven, the pinion 57 meshing with the rack 58 causes the movement of the first drive unit 50 in the Y direction. The second drive unit 51 attached to the first drive unit 50 is also moved in the Y direction.

As the second drive unit 51 includes the Z-axis motor 63, the pinion 64 meshing with the rack 65 causes the spindle 72 including the spindle motor 70 to move in the z direction.

These movements in the X, Y and Z directions are effected by the motors 40, 56 and 63 which are driven by the control devices not shown, and the foam block W is moved in the X direction, while the working unit 5 is moved in the Y and Z-directions. The driving force of the motor 70 drives the spindle 72 carrying at its end the cutting tool 73 facing the foam block W from below, and the combined movements of the cutting tool 73 in the Y and Z directions and the foam block W in the X direction enable the tool 73 to perform a cutting job.

The load imposed upon the Z-axis drive motor 63 by the weight of the spindle motor 70, spindle 72, and cutting tool 73 is reduced by the Z-axis balancer 69.

As a result of the operation described above, the foam block W is cut by the spindle 72 into a three-dimensional shape defining a vanishing pattern which is used in making e.g. a press die by casting.

According to this invention, a three-dimensional cutting job on a piece of work, such as a foam block, for preparing a vanishing pattern used in making a mold or die by casting is performed by moving the work only in one direction, e.g. in the X direction, while the cutting means including the spindle is moved in two other directions, as described above in detail. Therefore, the work is moved in a very small space, as compared with the prior art in which the work is moved in two horizontal directions (or the X and Y directions). As a result, the apparatus occupies only a small space for installation, and enables the effective saving of the space in a factory in which only a limited space is available.

The apparatus which allows the work to move only in one direction is simpler in construction than the apparatus which requires the work to move in two horizontal directions (or the X and Y directions).

As the work supporting table is moved only in one direction, a smaller load is imposed by the means and mechanism for moving it than by their counterparts in the known apparatus for moving the table in two directions. As a result, a greatly increased cutting speed can be achieved to enable the efficient preparation of a vanishing pattern from a foam block in a short time. The reduction which can be achieved in the weight of the means and mechanism for moving the work makes it possible to achieve an improved working accuracy. Thus, the apparatus can perform an efficient and accurate cutting job to prepare a vanishing pattern for a mold or die from e.g. a foam block. Although there has been described what is at present considered to be the preferred embodiment of the invention, it will be understood that changes and modifications may be made thereto without departing from the spirit of the invention. The scope of the invention is indicated by the appended claims rather than by the foregoing description.

What is claimed is:

1. A working apparatus comprising:
   a horizontally movable work supporting table for supporting a three-dimensional work thereon;
   means for moving said table in one direction in a horizontal plane;
   means disposed below said table in an upward orientation and movable in another direction for working on the work as supported on said table from below;
   means for moving said working means in said another direction;
   a tool held by said working means and movable in a different direction for working directly on the work;
   means for moving said tool in said different direction;
   said means for moving said table, said means for moving said working means, and said means for moving said tool are actuable being actuatable for causing said tool to cut a three-dimensional pattern into the work;
   said tool being supported on a driving device mounted on a base for said working means, and on an indirect base which is vertically movable by said driving device:
   said tool comprises a spindle provided with a cutting device at its end and supported by said indirect base to be driven by another driving device on said indirect base for performing a cutting job: and
   said another driving device for said tool and said spindle are provided with a balancer for their movement in the vertical direction, and said balancer comprises a rodless cylinder.

2. An apparatus as set forth in claim 1, further including a column on which said table is supported, and a driving device and mechanism for moving each of said table and said working means, and tool in said one direction and said another direction and said different direction, respectively, and a device and mechanism for driving.

3. An apparatus as set forth in claim 1, wherein said table moving means comprises a pair of rails provided on a column for supporting said table, a pair of rails provided on said table and engaging said rails on said column, and a third driving device and a power transmitting mechanism which are provided on said column.

4. An apparatus as set forth in claim 3, wherein said third driving device on said column is connected by said power transmitting mechanism to a pinions provided on said column and meshing with a racks provided on said table.

5. An apparatus as set forth in claim 1, wherein said working means is supported by a column, and said other direction is horizontally perpendicular to said one direction.

6. An apparatus as set forth in claim 5, wherein said column is provided with rails for moving and guiding said working means, said base for said working means is provided with a supporting base engaging engages said rails, said base is provided with a second driving device for moving said working means, and said base and column are provided with a mechanism for transmitting power from said second driving device to said working means.

7. An apparatus as set forth in claim 6, wherein said means for moving said working means includes a rack provided on said column, and a pinion provided on said second driving device on said base and meshing with said rack.

8. An apparatus as set forth in claim 1, wherein said indirect base is provided with a pinion which is driven by said driving device, said base for said working means is provided with a vertically extending rack, and said pinion meshes with said rack to move said indirect base including said tool in a vertical direction.

9. An apparatus as set forth in claim 1, wherein said spindle and the work are moveable in the three-dimensional pattern relative to each other to act upon the work from below as a result of transverse movement of said working means, the vertical movement of said indirect base and the longitudinal movement of said table.

10. An apparatus as set forth in claim 1, wherein the work is a foam block from which a vanishing pattern is formed by cutting for use in making a die by casting.

11. A working apparatus comprising:
    a horizontally movable work supporting table for supporting a three-dimensional work thereon:
    means for moving said table in one direction in a horizontal plane:
    means disposed below said table in an upward orientation and movable in another direction for working on the work as supported on said table from below:
    means for moving said working means in said another direction;
    a tool held by said working means and movable in a different direction for working directly on the work:
    means for moving said tool in said different direction:
    said means for moving said table, said means for moving said working means, and said means for moving said tool are actuatable for causing said tool to cut a threedimensional pattern into the work: and
    said work is a foam block, and said table is provided with a fixed clamp member for positioning and holding said work along one side thereof, an elastically movable clamp member located on the opposite side of said work from said fixed clamp member for holding said work against said fixed clamp member, and a pair of removable clamp members positioned at angles to said fixed and movable clamp members for positioning and holding said work along the remaining sides thereof.

12. An apparatus as set forth in claim 2, wherein said table moving means comprises a pair of rails provided on said column for supporting said table, a pair of rails provided on said table and engaging said rails on said column, and said driving device mechanism for moving said table are provided on said column.

13. An apparatus as set forth in claim 12, wherein said driving device on said column is connected by said mechanism to a pinion provided on said column and meshing with a rack provided on said table.

14. (new) An apparatus as set forth in claim 2, wherein said working means is supported by said column, and said another direction is horizontally perpendicular to said one direction.

15. An apparatus as set forth in claim 14, wherein said column is provided with rails for moving and guiding said working means, said working means is provided with a supporting base engaging said rails, said base is provided with said driving device for moving said working means, and said base and column are provided with said mechanism for transmitting moving said working means which transmits power from said driving device for moving said working means to said working means.

16. An apparatus as set forth in claim 15, wherein said means for moving said working means includes a rack provided on said column, and a pinion provided on said driving device on said base and meshing with said rack.

17. An apparatus as set forth in claim 2, wherein said tool is supported on a driving device mounted on said base for said working means, and on said indirect base which is vertically movable by said driving device, tool and said spindle are provided with a balancer for their movement in the vertical direction, and said balancer comprises a rodless cylinder.

18. An apparatus as set forth in claim 17 wherein said indirect base is provided with a pinion which is driven by said driving device mounted on said base for said working means, said base for said working means is provided with a vertically extending rack, and said pinion meshes with said rack to move said indirect base including said tool in a vertical direction.

19. An apparatus as set forth in claim 17, wherein said tool comprises a spindle provided with said cutting device at its end and supported by said indirect base to be driven by another driving said device and mechanism therefor, which is disposed on said indirect base, for performing a cutting job.

20. An apparatus as set forth in claim 18, wherein said tool comprises a spindle provided with said cutting device at its end and supported by said indirect base to be driven by another driving said device and mechanism therefor, which is disposed on said indirect base., for performing a cutting job.

21. An apparatus as set fort in claim 20, wherein said spindle and work are movable in the three-dimentional pattern relative to each other to act upon the work from below as a result of transverse movement of said means, vertical movement of said indirect base and longitudinal movement of said table.

22. A working apparatus comprising:

a horizontally movable work supporting table for supporting a three-dimensional work thereon:

means for moving said table in one direction in a horizontal plane:

means disposed below said table in an upward orientation and movable in another direction for working on the work supported on said table from below;

means for moving said working means in said another direction:

a tool held by said working means and movable in a different direction for working directly on the work:

means for moving said tool in said different direction;

said means for moving said table, said means for moving said working means, and said means for moving said tool are actuatable for causing said tool to cut a threedimensional pattern into the work:

a column on which said table is supported:

said means for moving said table, said means for moving said working means, and said means for moving said tool each comprising a driving device and mechanism:

said tool being supported on said driving device of said means for moving the tool, which is mounted on a base for said working means, and on an indirect base which is vertically movable by said driving device of said means for moving the tool;

said indirect base being provided with a pinion which is driven by said driving device of said means for moving the tool, said base for said working means being provided with a vertically extending rack, and said pinion meshing with said rack to move said indirect base including said tool in a vertical direction;

said tool comprising a spindle provided with a cutting device at its end and supported by said direct base to be driven by another driving device on said indirect base for performing a cutting job:

said spindle and the work being movable in the three-dimensional pattern relative to each other to act upon the work from below as a result of the transverse movement of said working means, the vertical movement of said indirect base and the longitudinal movement of said table: and said driving device of said means for moving said tool and said spindle are provided with a balancer for their movement in the vertical direction, and said balancer comprising a rodless cylinder.

23. An apparatus as set forth in claim 1, wherein the horizontal table has an opening defined therethrough, a lower surface of the work is exposed downwardly through the opening when the work is supported on the table, and said three-dimensional pattern is cut into the work through the downwardly exposed surface thereof.

24. An apparatus as set forth in claim 1, further including biased clamping means provided on a support surface of the supporting table for clamping the work at peripheral edges thereof such that the work is stably supported by the support surface and the clamping means during a cutting operation.

25. A working apparatus for cutting a three dimensional pattern into a three dimensional work, the apparatus comprising:

a horizontal table for supporting a three dimensional work thereon;

tool means disposed below said table in an upward orientation for working on the work as supported on the table from below;

first means for moving said table in one direction in a horizontal plane;

second means for moving said tool means in another different direction different from said one direction and parallel to the horizontal plane;

third means for moving said tool means vertically toward and away from the work supported on the table;

said first, second and third means are actuable actuatable for cutting a three dimensional pattern into the work: and said tool means comprising a spindle, a cutting device disposed at an end of the spindle, means for driving the spindle, and a balancer disposed between the spindle and the spindle driving means for balancing their movement in the vertical direction.

26. A working apparatus according to claim 25, wherein the horizontal table has an opening defined therethrough, a lower surface of the work is exposed downwardly through the opening when the work is supported on the table, and said three dimensional pattern is cut into the work through the downwardly exposed surface thereof by said tool means.

27. An apparatus as set forth in claim 25, further including biased clamping means provided on a support surface of the horizontal table for clamping the work at peripheral edges thereof such that the work is stably supported between the support surface and the clamping means during a cutting operation.

28. A working apparatus for cutting a three dimensional pattern into a three dimensional work, the apparatus comprising:

a horizontal table for supporting a three dimensional work thereon;

tool means disposed below said table in an upward orientation for working on the work as supported on the table from below:

first means for moving said table in one direction in a horizontal plane:

second means for moving said tool means in another direction different from said one direction and parallel to the horizontal plane:

third means for moving said tool means vertically toward and away from the work supported on the table:

said first, second and third means are actuatable for cutting a three dimensional pattern into the work:

a first clamp member located on said table for positioning and holding the work along one side thereof;

a second clamp member located on said table opposite said first clamp member and having a means for elastically urging the work against said first clamp member; and third and fourth clamp members which position and hold the work along the remaining sides thereof.

* * * * *

UNITED STATES PATENT AND TRADEMARK OFFICE
CERTIFICATE OF CORRECTION

PATENT NO : 5,785,469
DATED : 28 July 1998
INVENTOR(S): Teruo Kamada, Takashi Ichizawa It is certified that error appears in the above-identified patent and that said Letters Patent are hereby corrected as shown below:

Column 1, line 17, delete "a" (first occurrence only);
         line 19, delete "to a desired shape";
         line 20, before the period, insert --to a desired shape--;
         line 24, change "x" to --X--.
Column 2, line 14, delete "for";
         30th line, after "etc." begin a new paragraph with "Other".
Column 3, 24th line, change "3" to --3--;
         25th line, change "3" to --3--;
         28th line, change "3" to --3--;
         42nd line, after "thereof" insert a period;
         43rd line, begin a new paragraph with "The";
         47th line, change "the rear" to --rear--;
         line number 61, begin a new paragraph with "The";
         line number 62, change "3" to --3--;
         line number 63, change "w" to --W--.
Column 4, 12th line, change "3in" to --3 in--;
         23rd line, change "3" to --3--;
         31st line, change "z" to --Z--;
         45th line, begin a new paragraph with "The";
         line number 61, change "guides.67" to --guides 67--.
Column 5, 28th line, change "30" to --30--;
         36th line, change "30" to --30--;
         50th line, change "chips-resulting" to --chips resulting--.
Column 6, line 4, after "pinions" (first occurrence) insert --43--;
    change "end 5" to --ends--;
         line 7, begin a new paragraph with "If";
         14th line, change "z" to --Z--;
         line numbered 46, change "the space" to --space--;
         line number 65, begin a new paragraph with "Although".
Column 7, 21st line, delete "are actuable";
         line 38, delete ", and tool";
         line 39, delete "and said different direction"; after "respectively" delete the comma;
         line 40, delete "and a device and mechanism for driving";

UNITED STATES PATENT AND TRADEMARK OFFICE
CERTIFICATE OF CORRECTION

PATENT NO : 5,785,469
DATED : 28 July 1998
INVENTOR(S): Teruo Kamada, Takashi Ichizawa It is certified that error appears in the above-identified patent and that said Letters Patent are hereby corrected as shown below:

Column 7 (cont.), line 49, change "pinions" to --pinion--;
    line 50, change "racks" to --rack--;
    line 52, change "other" to --another--;
    lines 56-57, delete "is provided with a supporting base engaging".
Column 8, line 9, delete "the" (both occurrences);
    line 31, change "threedimensional" to --three-dimensional--;
    line 61, delete "transmitting".
Column 9, lines 4-7, delete ", tool and said spindle are provided with a balancer for their movement in the vertical direction, and said balancer comprises a rodless cylinder";
    18th line, delete "another driving";
    24th line, delete "another driving";
    25th line, before the comma delete the period;
    line 27, change "fort" to --forth--;
    line 28, before "work" insert --the--;
    line 30, before "means" insert --working--;
    line 49, change "threedimensional" to --three-dimensional--.

Column 10, line between line numbers 35 and 36, change "different direction different" to --direction different--;
    line numbered approximately 40, delete "actuable".

Signed and Sealed this

Twenty-fourth Day of August, 1999

Attest:

Q. TODD DICKINSON

*Attesting Officer*      *Acting Commissioner of Patents and Trademarks*